Sept. 1, 1931.  D. C. MARTIN  1,821,717
STORAGE BATTERY TERMINAL CONNECTION
Filed Aug. 29, 1929
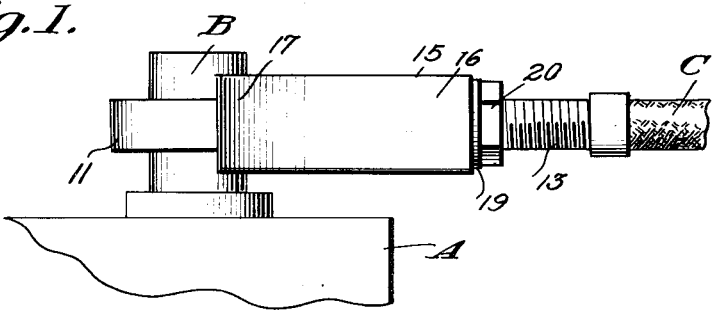
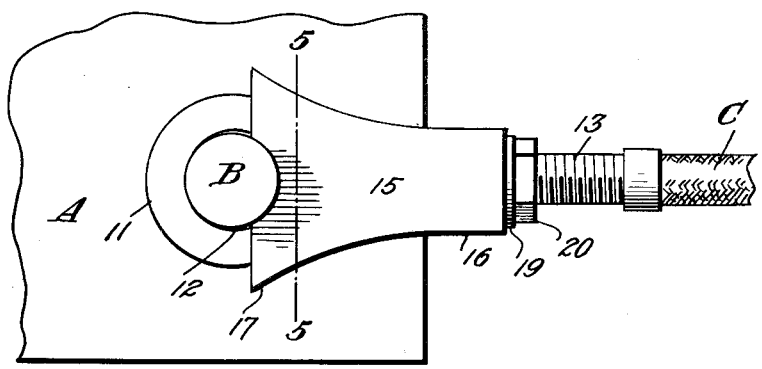
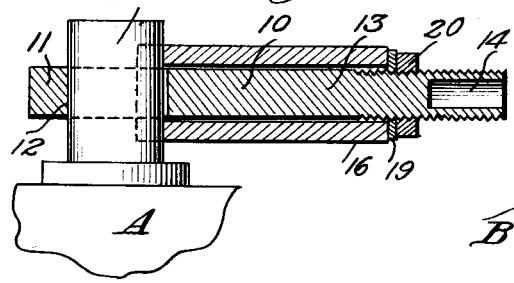
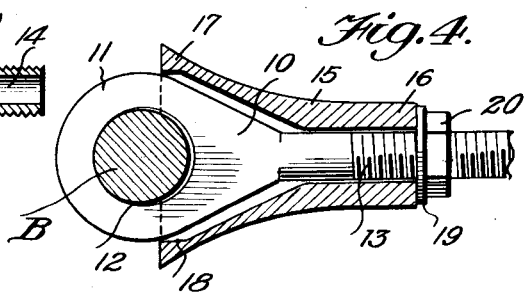
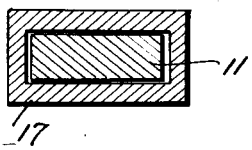
D. C. Martin
INVENTOR
BY Victor J. Evans
ATTORNEY Patented Sept. 1, 1931

1,821,717

UNITED STATES PATENT OFFICE

DOUGALL C. MARTIN, OF PADEN CITY, WEST VIRGINIA, ASSIGNOR OF ONE-HALF TO EVERETT F. SCHAFFER, OF PADEN CITY, WEST VIRGINIA

STORAGE BATTERY TERMINAL CONNECTION

Application filed August 29, 1929. Serial No. 389,256.

The invention relates to terminal connections for storage batteries and has for its object the provision of a novel terminal device by means of which a cable or other electrical conductor may be securely mounted upon and connected with the terminal post of a storage battery and as easily detached or disengaged therefrom when occasion arises.

It is well known that there is considerable difficulty experienced in handling the ordinary type of storage battery terminal and cable connections for the reason that the means ordinarily employed corrodes on account of the acid fumes and also on account of creeping of the acid, this corrosion very seriously affecting the operation of detaching the cable when such is necessary for any reason as for example when the battery must be removed from an automobile, aeroplane or the like for the purpose of recharging it. As a matter of fact it very frequently occurs that the terminal on the cable is damaged beyond repair and that the terminal post of the battery is also so damaged and battered as to need replacement. It is with these facts in view that I have designed the present invention which has for its principal object the provision of a very efficient and secure connection which will at the same time be readily capable of detachment when necessary without injury to any of the parts whatsoever.

Another object of the invention is to provide an arrangement of this character which will embody the minimum number of parts and which will therefore be extremely simple and inexpensive to make, use or install and which will at the same time be highly efficient in service, durable and a general improvement in the art.

With the above and other objects and advantages in view, the invention preferably consists in the details of construction and the arrangement and combination of parts to be hereinafter more fully described and claimed, and illustrated in the accompanying drawings, in which:—

Figure 1 is a fragmentary side elevation of a battery and a terminal post showing my connector engaged thereon.

Figure 2 is a top plan view.

Figure 3 is a vertical longitudinal section taken through my connector in engagement upon the battery post.

Figure 4 is a horizontal sectional view.

Figure 5 is a detail cross sectional view taken on the line 5—5 of Figure 2.

Referring more particularly to the drawings, the letter A designates a portion of a storage battery and B represents one of the terminal posts thereof to which is to be connected a conductor C. In carrying out the invention I provide an eye-bolt 10 including a head 11 with a circular aperture or opening 12 therein and a shank 13 which is suitably threaded. The opening 12 in the head 11 is preferably of slightly greater diameter than the terminal post B so as to be readily engageable thereon. The free or projecting end portion of the shank 13 is represented as formed with a socket 14 which receives the conductor C which is secured as for example by means of soldering, brazing, welding or the like, this detail being immaterial. Of course, conductors of this type are naturally insulated except for that portion which is located within the socket 14.

In conjunction with the eye-bolt 10 I also make use of a species of yoke or sleeve member 15 including an elongated tubular portion 16 slidably engageable upon the shank 13 and further including a laterally widened yoke portion 17 of slightly less width than the diameter of the head 11 and preferably so formed as to provide edges 18 adapted to engage forcibly against the head 11 to insure proper electrical contact. As a matter of fact the head 11 of the eye-bolt and the yoke portion 17 of the sleeve are preferably rectangular in cross section as clearly indicated in Figure 5.

In addition to the foregoing parts, the connection further includes a washer 19 embracingly engaged upon the shank 13, and a nut 20 screwed onto the shank.

Of course, it is assumed in the first place that the sleeve or yoke member 15 is telescopically engaged upon the eye-bolt, subsequently to which the conductor C is secured within the socket 14 in a well known manner. The device is then ready for engagement upon the terminal post B and this engagement is effected by slipping the opening 12 in the head 11 of the eye-bolt over and onto the terminal post B. The sleeve or yoke member 15 may then be slid along the eye-bolt into substantial engagement with the head thereof, after which the nut 20 is screwed down tightly which will have the effect of moving the eye-bolt and sleeve member 15 relatively to effect a clamping action between the same and upon or against the terminal post B as clearly indicated in Figure 4 of the drawing.

When it is desired to disconnect the conductor C for any reason the nut 20 is backed off so as to release the clamping engagement between the eye-bolt and the yoke or sleeve member 15 subsequently to which the eye-bolt may be turned partly back and forth or otherwise treated to break or loosen its engagement with the terminal post, an action which is readily carried out even though there may be a certain amount of corrosion at the contacting surfaces. In any event, it is quite apparent that it will be absolutely unnecessary to apply such a degree of force as would tend to damage any of the parts. For this reason it is readily apparent that the device will be a distinct improvement over the common methods of and means for attaching conductors as it is well known that the corrosion very seriously affects all such ordinary devices and renders it extremely difficult to effect disconnection. From the foregoing it is believed that the construction, operation and advantages will be readily apparent to one skilled in the art without further explanation.

While I have shown and described the preferred embodiment of the invention, it should be understood that I reserve the right to make all such changes in the details of construction and the arrangement and combination of parts as will not depart from the spirit of the invention or the scope of the subjoined claim.

Having thus described the invention, I claim:—

A battery connection comprising a screw threaded shank having a socket in one end to receive and have secured thereto an electrical conductor, a head formed on the other end of the shank and having an opening to receive a battery post, said head having oppositely inclined faces between the opening and shank to provide a wedge-shaped portion, a sleeve on said shank and having one end flared and of substantially rectangular shape in cross section and having arcuate shaped cut-out portions in opposite sides thereof to receive the post, inwardly extending projections on the flared end of the sleeve to engage the wedge-shaped portion of the shank, and a fastener threaded on the shank to force the flared end of the sleeve and head of the shank against the post.

In testimony whereof I affix my signature.

DOUGALL C. MARTIN.